May 8, 1962  B. H. JOHNSA  3,032,934
GRINDER

Filed May 28, 1959  2 Sheets-Sheet 1

INVENTOR.
BERRY H. JOHNSA
BY
ATTORNEY

May 8, 1962  B. H. JOHNSA  3,032,934
GRINDER
Filed May 28, 1959  2 Sheets-Sheet 2
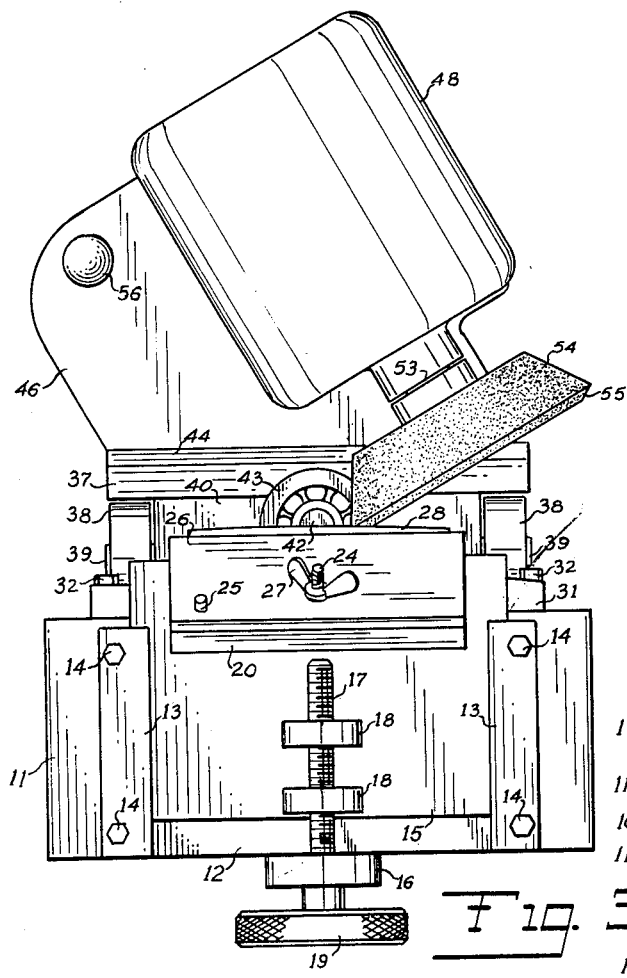
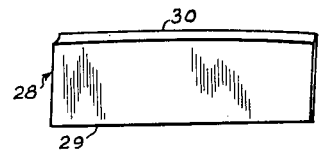
Fig. 6
Fig. 7
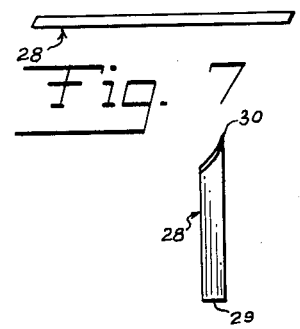
Fig. 8
Fig. 9
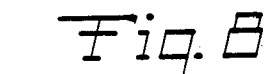
Fig. 4
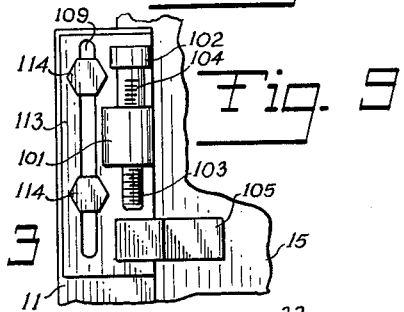
Fig. 5
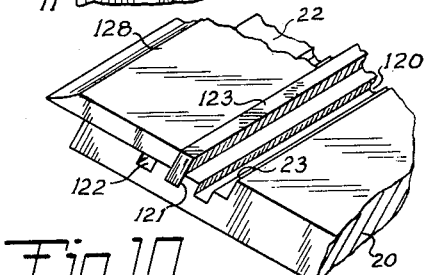
Fig. 10
INVENTOR:
BERRY H. JOHNSA
BY:
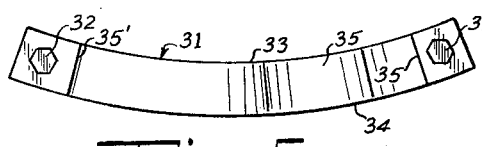
ATTORNEY

United States Patent Office 3,032,934
Patented May 8, 1962

3,032,934
GRINDER
Berry H. Johnsa, Atlanta, Ga., assignor to Atlanta Oak Flooring Company, Atlanta, Ga., a corporation of Georgia
Filed May 28, 1959, Ser. No. 816,546
17 Claims. (Cl. 51—100)

This invention relates to grinders, and is more particularly concerned with a contour grinder which will sharpen a blade to provide a non-linear cutting edge.

In the past, substantially all blades for wood planing machines or jointers have had an essentially linear cutting edge which may be produced by conventional sharpening, equipment. I have discovered, however, that cutter head blades which have a convex cutting edge and are arranged in the cutter head at an acute angle with respect to the axis of rotation of the cutter head produce a superior finished surface and remain sharp for extended periods of time. The cutter head with the angularly disposed blades is the subject matter of my copending application now U.S. Patent No. 2,969,816.

It is necessary, when angularly disposed blades are to be employed in a cutter head, that some means be provided whereby the cutting edges of the blades may, periodically, be quickly and easily resharpened so that successive blades may be provided with uniform, arcuate cutting edges. Furthermore, not only must successive blades be provided with edges having substantially the same arcuate shape, but all such blades, each time they are sharpened, must be reduced in width by substantially a uniform amount since the blades must all protrude substantially the same distance from their blade carrying recesses in the periphery of the cutter head.

With these problems in mind, I have devised a simple but effective blade grinder which includes a grinding implement which has essentially a linear or convex grinding surface. This grinding implement is motivated by a motor in a predetermined path with respect to a carrying arm. At a point remote from the grinding implement the carrying arm is pivotally secured to a base so that movement of the arm moves the motivated grinding implement in a predetermined path. At a position adjacent the motivated grinding implement is a template or cam secured to the base, having a follower on the carrying arm adapted to ride along the surface of the template and thereby position the grinding surface at predetermined distances from the base, depending upon the radial position of the carrying arm. Also incorporated in my grinder is a blade holding assembly which holds the blade to be sharpened in a predetermined position with respect to the motivated grinding implement. This blade holding assembly is usally secured to the base and is provided with means for incrementally moving the blade toward and away from the grinding implement while at the same time holding the blade at a predetermined angle for engagement by the grinding implement.

Accordingly, it is an object of the present invention to provide a grinder which will easily and quickly provide a non-linear sharpened edge of predetermined contour on a blade or the like.

Another object of my invention is to provide a grinder which will sharpen succesive blades in similar predetermined contours so as to provide non-linear sharpened cutting edges on the successive blades.

Another object of my invention is to provide a grinding machine which will sharpen a blade by a predetermined amount so that succesive blades may be provided with sharp edges as the width of each blade is reduced substantially the same amount.

Another object of my invention is to provide a grinder which is inexpensive to manufacture, durable in structure and efficient in operation.

Another object of my invention is to provide a grinder which will produce a predetermined precise contour on a blade while at the same time reducing the blade by a predetermined amount.

Another object of my invention is to provide a precision grinder which may be operated by a semi-skilled workman.

Other objects, features and advantages of the present invention will become apparent from the following description when taken in conjunction with the accompanying drawings wherein the characters of reference designate corresponding parts throughout the several views and wherein:

FIG. 3 is a front elevation of the grinder shown in FIG. 1.

FIG. 4 is a view of a detail showing the enlarged front elevation of the template of FIG. 1.

FIG. 5 is a plan view of the template shown in FIG. 4.

FIG. 6 is an elevation of the cutter head blade having a cutting edge ground by the grinder of FIG. 1.

FIG. 7 is a plan view of the blade shown in FIG. 6.

FIG. 8 is an enlarged end view of the blade shown in FIGS. 6 and 7.

FIG. 9 is an enlarged fragmentary front elevation of the clamp carrying plate of the machine in FIG. 1, modified by the provision of an adjustable stop.

FIG. 10 is an enlarged perspective view of a modified form of fixed jaw for use in the grinder shown in FIG. 1.

Figure 1:
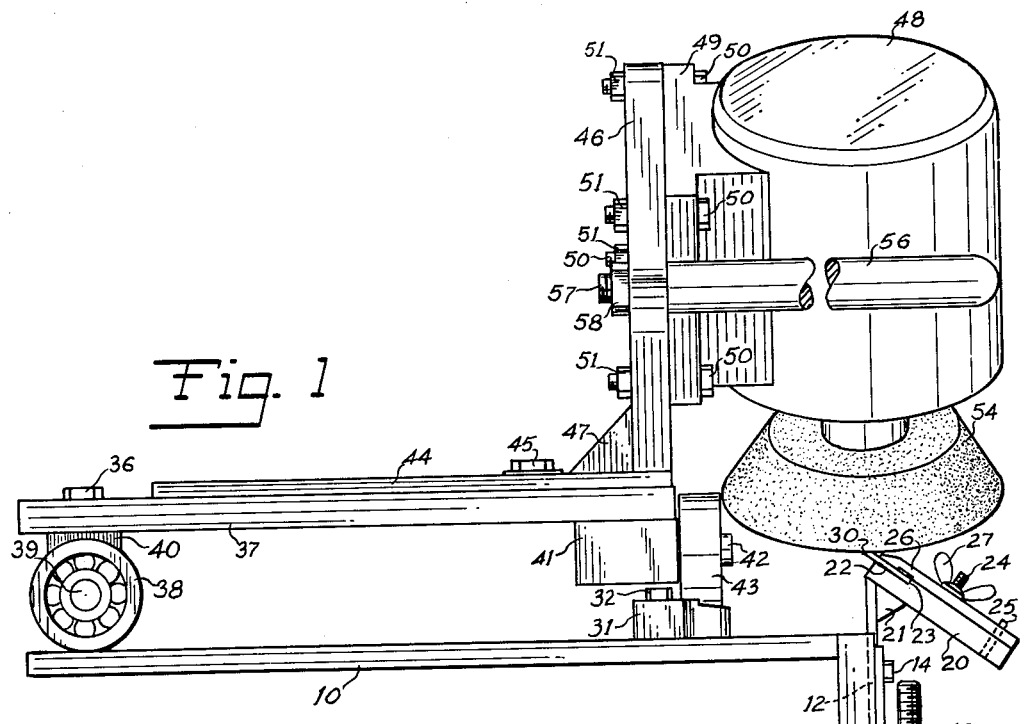
FIG. 1 is a side elevation of the present invention in its preferred form.
Figure 2:
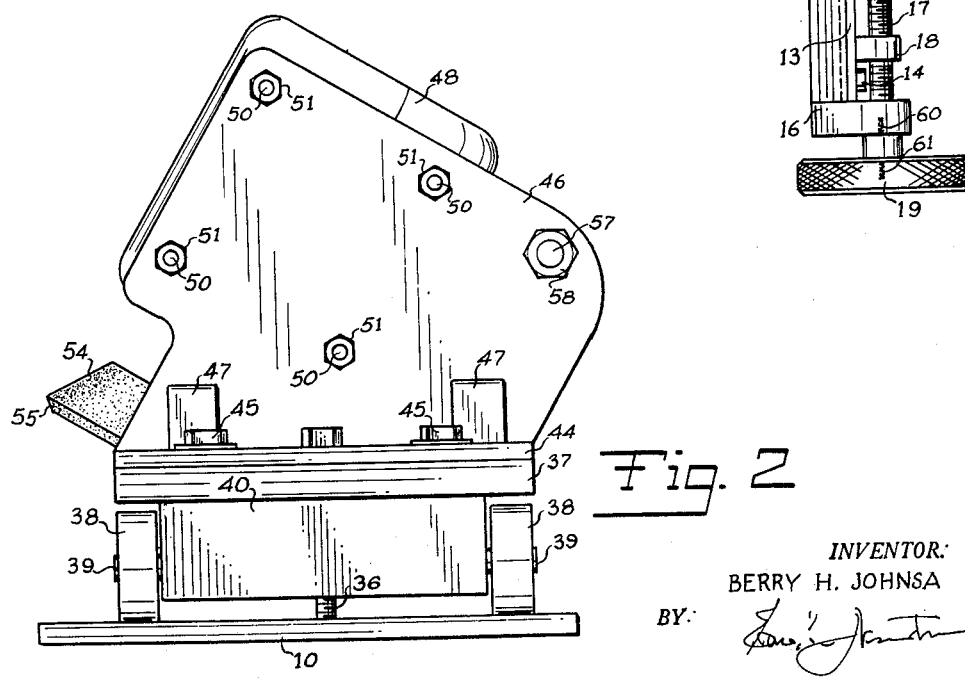
FIG. 2 is a rear elevation of the grinder shown in FIG. 1.

Referring now in detail to the embodiment chosen for the purpose of illustrating the present invention, numeral 10 denotes a substantially rectangular flat base which is usually mounted on a work bench (not shown) or the like so as to extend horizontally to the edge thereof. At one end of the flat base 10 is a blade clamping assembly including a vertically disposed clamp carrying plate 11 which depends from the end of base 10 and usually extends along a vertical edge of the work bench. This plate 11 is provided with a central slot 12 extending vertically throughout the length of the plate 11. On opposite sides and overlapping the slot 12 are spaced retainer plates 13 which are secured in place by bolts 14.

Slidably received within the slot 12 and retained for vertical movement therein by retainer plates 13 is a slide plate 15, best seen in FIGS. 1 and 3. At the bottom edge of plate 11, a screw carrying arm 16 projects outwardly in a horizontal direction beyond slide plate 15 so as to limit the downward movement of slide plate 15. The arm 16 journals for rotation a vertical helical screw 17 which extends upwardly parallel to slide plate 15. A pair of spaced lugs 18 projects from the outer surface of slide plate 15 and threadedly engages screw 17.

For manipulating screw 17, a knurled handle 19 is provided on the lower end of screw 17. Screw 17 is fixed axially with respect to arm 16; thus, upon rotation of screw 17 about its axis in one direction or the other, slide plate 15 will be moved upwardly or downwardly with respect to plate 11.

The upper end of slide plate 15 usually protrudes beyond the upper surface of base 10 and is provided with a blade clamping member including a pair of cooperating jaws. The fixed jaw 20 is a rectangular member, the recessed end of which is secured to the upper end of slide plate 15. Jaw 20 protrudes downwardly and outwardly at an acute angle of about 57° from slide plate 15 and is supported in that position by a gusset 21. The upper surface of the fixed jaw 20 is recessed along its uppermost edge to provide a flat blade receiving ledge 22 having straight inner shoulder 23. Protruding centrally from the upper surface of jaw 20 is a stud 24 provided with external threads. A dowel pin 25, spaced from and parallel to stud 24, also protrudes from this upper surface of jaw 20.

The movable jaw 26 is complementary to jaw 20 and includes apertures aligned with the stud 24 and dowel pin 25 so that when the jaw 26 is properly aligned with jaw 20 and is brought into engagement with jaw 20, stud 24 and dowel pin 25 protrude through these apertures. A removable wing nut 27 threadedly received on stud 24 locks jaw 26 to jaw 20.

It will be observed that the upper end of jaw 26 overlaps ledge 22 so that a blade, such as blade 28, may be carried between the lower surface of jaw 26 and the surface of ledge 22 with the bottom edge 29 of blade 28 abutting the shoulder 23 and the cutting edge 30 protruding beyond these jaw members 20 and 26. This blade 28, of course, will be held essentially at a fixed acute angle with respect to base 10 and may be moved upwardly or downwardly by movement of slide plate 15.

It will be understood, of course, that various means may be employed for retaining the blade in its fixed angular position with respect to the slide plate 15; and that the term "clamping member" as used herein means any device employed for retaining a blade in a fixed position. Thus, the present invention specifically includes electro-magnetic chucks or other mechanical equivalents of the jaw members 20 and 26 which were chosen to illustrate but one form of clamping member.

At an intermediate position, preferably adjacent the blade holding assembly, on the upper surface of base 10, template 31 is secured to base 10 by means of bolts 32 at opposite ends of template 31. As seen in FIG. 5, the template 31 is arcuate in plan view, having an inner side 33 and an outer side 34 which define concentric arcs of circles. The lower surface of the template 31 is flat while the upper surface of the template includes a camming surface 35 which is generally convex. At the ends of camming surface 35 are limit shoulders 35' which prevent overtravel of the cam follower to be described hereinafter.

The template 31 is arranged on base 10 in such a manner that the center of circles including the arcs of sides 33 and 34 falls within the confines of base 10, and slide plate 15 is in a plane parallel to a plane tangent to the arcs. At this center, which is near the opposite end of base 10, is an upstanding pivot pin 36. A radial arm 37, which is pivotally mounted to pivot pin 36, extends generally parallel to base 10 toward template 31. To prevent the radial arm 37 from tilting transversely, I have provided a pair of spaced bearing wheels 38 on opposite sides of, and equally spaced from, pivot pin 36. Bearing wheels 38 are carried by aligned transversely disposed stub shafts 39 projecting into a wheel carrying block 40, secured to the lower side of the radial arm 37. The shafts 39, in addition to being aligned with themselves, are on diametrically opposite sides of pivot pin 36, and are essentially normal to the radial arm 37.

At the opposite end of the radial arm 37 and projecting from the lower side thereof is a cam follower block 41 provided with a stub shaft 42 which projects longitudinally over the camming surface 35 of template 31. A cam follower or wheel 43 is provided on stub shaft 42 so as to engage and ride along surface 35. The axis of shaft 42 intersects pivot pin 36; therefore, each wheel 38 is equidistant from shaft 42, and the axis of shafts 39 is generally normal to that of shaft 42.

Therefore, as the radial arm 37 is moved back and forth, the forward end of radial arm 37 will be raised or lowered in response to the contour of camming surface 35 and the radial arm will, therefore, pivot upwardly and downwardly about a transverse line through the head of pivot pin 36. As the radial arm 37 is moved back and forth, wheels 38 ride along the surface of base 10 to maintain the radial arm 37 transversely level.

Mounted on the upper surface of the radial arm 37 is a grinder carrying assembly which includes a right angular bracket including a flat mounting plate 44 provided with spaced longitudinally extending slots (not shown) through which bolts 45 project to secure the mounting plate to the top surface of radial arm 37. Thus, upon the loosening of bolts 45, the mounting plate 44 may be moved longitudinally with respect to radial arm 37. When, however, the bolts 45 are tightened, the mounting plate 44 is fixed with respect to radial arm 37.

The upright portion of the right angular bracket includes a motor carrying plate 46, the lower end of which is secured to the forward end of mounting plate 44. Gussets 47 reinforce the junction of these bracket plates 44 and 46. On the front face of the carrying plate 46 is secured a motor 48 having a motor mounting block 49. Bolts 50, which pass through mounting block 49 and through the carrying plate 46, are secured in place by nuts 51. Motor 48 is so arranged on carrying plate 46 that the shaft 53 of motor 48 may be disposed vertically over the blade 28. The axis of shaft 53, however, extends parallel to carrying plate 46 and is at an acute angle with respect to the plane of base 10. A grinding wheel 54 is fixed to the end of shaft 53 and is a cup shaped member having a thin, bevelled front periphery 55, the lowermost portion of which is essentially tangential to a plane parallel to base 10 so as to engage an increment of the cutting edge 30 of blade 28, as held by jaws 20 and 26.

It will be remembered that the cam follower or wheel 43 and camming surface 35 of template 31 determine the vertical position of the radial arm 37, depending upon the radial position of arm 37 with respect to base 10. For pivoting the radial arm 37 and thereby moving the grinding wheel 54 across the edge 30 of the blade 28, I have provided a handle 56 having a reduced, threaded shaft 57 projecting through an appropriate aperture in bracket arm 46 and retained in place by a nut 58.

Referring now to FIG. 9, it will be seen that, if desired, an adjustable stop may be provided to prevent overtravel of the slide plate 15. This adjustable stop includes a retainer plate 113 which is substituted for one of retainer plates 13. A vertical slot 109 is provided in the retainer plate 113 and is sufficiently long that it may receive the bolts 114 which threadedly engage the clamp carrying plate 11. Upon loosening of bolts 114, the retainer plate 113 may be adjusted vertically and thereafter secured in position upon the tightening of bolts 114.

Carried by plate 113 is a journal member 101 having a vertical bore, the lower portion of which is provided with internal threads (not shown). A vernier bolt or screw 102 protrudes through the bore in journal block 101 and is provided with external threads 103 along its lower portion. The upper portion of screw 102 is cylindrical having a scale of vernier scribe marks 104 therealong. Thus, the distance which screw 102 protrudes through journal block 101 may be read on the scale. The lower end of screw 102 protrudes below block 101 and is in the path of travel of a screw engaging member 105 secured to slide plate 15 and projecting over retainer plate 114.

It is now seen that the end of screw 102 forms a stop which prevents the upward travel of slide plate 15 beyond a preselected position.

Referring now to FIG. 10, it will be seen that spaced parallel grooves 120, 121 and 122 may be provided in blade receiving ledge 22 of jaw 20. These grooves 120, 121 and 122 are parallel to shoulder 23 and selectively received a removable abutment member such as shoulder block 123 against which the lower edge of shorter blades, such as blade 128, abut.

*Operation*

From the foregoing description, the operation of my grinder is apparent. If a set of blades from a single drum is to be ground or sharpened the same amount, the most damaged blade is selected to be ground first. This blade to be ground or reground is then placed on ledge 22 with its bottom edge 29 abutting the shoulder 23 and the bevelled portion of edge 30 up. The movable jaw 26 is then placed over jaw 20 and the wing nut 27 is replaced and tightened on stud 24, thereby causing jaw 26 to clamp the blade 28 against jaw 20.

Thereafter, the knurled handle 19 is rotated to rotate screw 17 and thereby lift slide plate 15. Since the jaws 20, 26 carrying the blade 28 are in turn carried by the end of slide plate 15, the edge 30 travels in a straight path as the blade 28 is lifted, and approaches the lower-most portion of bevel 55 of grinding wheel 54. It will also be observed that engaging portion of periphery 55 is essentially transversely disposed with respect to edge 30. As the cutting edge 30 touches the wheel 54, rotation of handle 19 is stopped and vertically aligned chalk marks 60 and 61 are placed on screw carrying arm 16 and handle 19, as indicated in FIG. 1.

Next, motor 48 is energized to rotate grinding wheel 54 and thereafter, the bevelled periphery 55 of wheel 54 is moved across edge 30 by reciprocation of handle 56 from left to right in FIG. 3. By this reciprocal movement, the radial arm 37 is made to pivot about pivot pin 36 so that the engaging portion of periphery 55 remains at a constant fixed distance from pivot pin 36, as the cam follower or wheel 43 rides along camming surface 35 of template 31. This, of course, moves the grinding wheel 54 in an arcuate path; hence, the bevelled periphery 55 traverses the essentially tangentially arranged cutting edge 30 of blade 28 in the arcuate path prescribed by the surface of template 35.

Gradually, as the reciprocation of the grinding wheel 54 across edge is continued, handle 19 is rotated so as to move the blade 28 upwardly. Any movement of the blade 28 upwardly more quickly than the periphery 55 can remove the surface of edge 30 simply tends to lift the radial arm 37 and the grinder carrying assembly, pivoting the same about the head of pivot pin 36. Thus, as soon as any lifting action is observed, the rotation of knurled handle 19 should be discontinued until the periphery 55 removes the surface of edge 30.

When it is observed that all nicks and indentations in the edge 30 of blade 28 have been removed and a sharp edge is restored, the rotation of knurled handle 19 is discontinued and another chalk mark is placed on handle 19 in alignment with chalk mark 60. The distance between the two chalk marks such as mark 61 on handle 19 is an indication for how much grinding should be done to subsequent blades in the set of blades.

If my grinder is provided with the adjustable stop illustrated in FIG. 8, it is not necessary to make chalk marks 60 and 61. Instead, after the grinding of the most damaged blade is completed, the screw 102 is rotated until its end abuts screw engaging member 105. Thereafter, each successive blade is lifted into grinding engagement by jaws 20, 26 until screw engaging member 105 engages screw 102.

If short blades such as blade 128 are to be ground, shoulder block 123 is positioned in one of grooves 120, 121 or 122 and the blade 128 positioned as described previously with its lower edge abutting shoulder block 123 in place of shoulder 23. The jaw 26 may then be positioned over jaw 20 so as to clamp blade 128 in place and grinding of the blade accomplished as above described.

It will be obvious to those skilled in the art that many variations may be made in the embodiment chosen for purpose of illustrating the present invention, without departing from the scope of my invention as defined by the appended claims.

I claim:

1. A grinder comprising a base, a slide plate carried by said base, jaw means on said slide plate adapted to retain successive blades in preselected positions with the edge of each blade protruding from said jaw means, a radial arm pivotally mounted on said base, a grinding means on said radial arm for engagement with said edge of said blade in said jaw means, and means for varying the position of said grinding means with respect to said blade in accordance with the radial position of said radial arm.

2. A grinder comprising a base, means connected to said base for holding successive blades to be sharpened in a fixed position with respect to said base, contour forming means connected to said base, a radial arm pivotally mounted on said base and controlled by said contour forming means, drive means carried by said radial arm, grinding means on said drive means for engagement with said edge of each blade, and means for pivoting said radial arm to cause said grinding means to traverse said edge of said blade, said contour means varying the position of said grinding means with respect to said blade in accordance with the radial position of said radial arm.

3. A grinder comprising a base, means connected to said base for carrying a blade to be sharpened, said blade being so positioned that its cutting edge protrudes from said means, a pivot pin on said base remote from said means, an arcuate template on said base concentric with said pivot pin and between said pivot pin and said means, a radial arm movably mounted with respect to said base and connected to said pivot pin for pivotal movement thereabout, follower means mounted on said radial arm for following said template, said template being provided with a camming surface, said follower means engaging said camming surface, drive means carried by said radial arm, grinding means on said drive means for engagement with an increment of said cutting edge of said blade, means for pivoting said radial arm about said pivot pin to cause said grinding means to traverse said cutting edge of said blade and means for incrementally moving said blade toward and away from said grinding means by a preselected amount.

4. A grinder comprising a base, clamping means on said base for holding a blade at a predetermined angle with respect to said base and for moving said blade in a path essentially normal to said base, the edge of said blade protruding from said clamping means, a template carried by said base adjacent said clamping means, a radial arm pivotally mounted on said base, follower means mounted on said radial arm for following said template and for moving said radial arm in a path in accordance with the radial position of said radial arm, drive means carried at the end of said radial arm adjacent said blade, grinding means on said drive means for engagement with said edge of said blade and means for pivoting said radial arm to cause said grinding means to traverse said edge of said blade.

5. A grinder comprising a flat base, a clamp carrying plate secured to said base at one end thereof, a slide plate slidably carried by said carrying plate, means for moving said slide plate with respect to said carrying plate, a first jaw disposed at an acuate angle with respect to said slide plate and carried by the end of said slide plate, a second jaw in clamping engagement with said first jaw, said jaws being adapted to retain a blade therebetween with its edge protruding from said jaws, a radial arm pivotally mounted on said base, drive means carried by said radial arm, a grinding wheel on said drive means for peripheral engagement with an increment of said edge of said blade in said jaws, and means for pivoting said radial arm to cause said grinding wheel to traverse said edge of said blade.

6. A grinder comprising a flat horizontally disposed base, a vertically disposed clamp carrying plate secured to said base at one end thereof, there being provided a vertical slot in said carrying plate, a slide plate carried in said slot in said carrying plate, a pair of spaced retainer plates on said carrying plate extending over the opposite edges of said slide plate, a lug extending from said slide plate, a screw aligned with said slide plate and carried for rotation about its axis by said carrying plate, a handle for rotating said screw, said screw threadedly engaging said lug on said slide plate, a first jaw disposed at an angle and carried by the end of said slide plate, a second jaw in clamping engagement with said first jaw, said jaws being adapted to retain a blade therebetween with its edge protruding from said jaws, a pivot pin on said base remote from said jaws, a template on said base between said pivot pin and said jaws, a radial arm movably mounted on said base and connected to said pivot pin for pivotal movement thereabout, means on said radial arm for maintaining said radial arm transversely level, follower means mounted on said radial arm for following said template, said template being provided with a convex camming surface, said follower means riding on said camming surface for moving the end of said radial arm from its plane of pivot, drive means provided with a drive shaft and carried by said radial arm, said drive shaft being disposed over said blade, a grinding wheel on said drive shaft for peripheral engagement with said edge of said blade in said jaws, and means for pivoting said radial arm about said pivot pin to cause said grinding wheel to traverse said edge of said blade.

7. Method of grinding a blade comprising the steps of holding said blade at a predetermined angle, positioning a grinding device adjacent the edge of said blade, moving said grinding device at a fixed distance from a point, and moving said grinding device toward and away from said blade in accordance with a predetermined pattern.

8. Method of grinding a blade comprising the steps of holding said blade at a predetermined angle with respect to a plane, moving a grinding device at a fixed distance from a point across the edge of said blade and moving said grinding device toward and away from said blade in accordance with a predetermined pattern dependent upon the radial position of said grinding device.

9. Method of grinding a convex edge on a blade comprising the steps of holding said blade at a predetermined angle with respect to a plane, pivoting a grinding device about in said plane across the edge of said blade while simultaneously moving said grinding device in an arcuate path with respect to said plane.

10. Method of grinding a convex edge on a blade comprising the steps of arranging said blade at a fixed angle with respect to a first plane such that the edge of said blade is essentially in said first plane, moving said blade at said fixed angle along said plane, there being a second plane about normal to said first plane, pivoting a grinding device across said edge at a fixed distance from a point within said second plane, and simultaneously therewith moving said grinding device predetermined distances from said second plane in accordance with the radial position of said grinding device.

11. Method of grinding a convex edge on a blade comprising the steps of holding said blade adjacent a grinding device, and moving said grinding device in a path a fixed distance from a point over the edge of said blade while simultaneously deviating said grinding device from said plane in accordance with a predetermined pattern and dependent upon the radial position of said grinding device.

12. A grinder comprising a base, a slide plate carried by said base, jaw means on said slide plate adapted to retain a blade with its edge protruding from said jaw means, grinding means carried by said base, said grinding means being rotatable about its axis, said axis being movable with respect to said base, means for adjusting the position of said jaw means with respect to said grinding means, and stop means connected respectively to said base and said means for adjustably fixing the position of said jaw means, said stop means being engageable with each other to limit the travel of said jaws with respect to said grinding means, said grinding means being movable across said edge of said blade independently of the movement of said jaw means.

13. A grinder comprising a base, a slide plate carried by said base, jaw means on said slide plate adapted to retain a blade with its edge protruding from said jaw means, grinding means carried by said base, said grinding means being rotatable about its axis, said axis being movable with respect to said base, means for adjusting the position of said jaw means with respect to said grinding means, stop means connected respectively to said base and said means for adjusting the position of said jaw means, said stop means being engageable with each other to limit the travel of said jaws with respect to said grinding means, and means connected to said stop means for varying the position of one of said stop means.

14. A grinder comprising a base, a slide plate carried by said base, jaw means on said slide plate adapted to retain a blade with its edge protruding from said jaw means, grinding means carried by said base, said grinding means being rotatable about its axis, said axis being movable with respect to said base, means for adjusting the position of said jaw means with respect to said grinding means, carried by and abutment means selectively positionable with respect to said jaw means against which the lower edge of said blade abuts.

15. A grinder comprising a base, a slide plate carried by said base, jaw means on said slide plate adapted to retain a blade with its edge protruding from said jaw means, grinding means carried by said base, said grinding means being rotatable about its axis, said axis being movable with respect to said base, means for adjusting the position of said jaw means with respect to said grinding means, said jaw means including a pair of cooperating jaws, there being provided in one of said jaws a recess defining a blade supporting ledge and an abutment shoulder.

16. A grinder comprising a base, a slide plate carried by said base, jaw means on said slide plate adapted to retain a blade with its edge protruding from said jaw means, grinding means carried by said base, said grinding means being rotatable about its axis, said axis being movable with respect to said base, means for adjusting the position of said jaw means with respect to said grinding means, said jaw means including a pair of cooperating jaws, there being provided in one of said jaws a recess defining a blade supporting ledge, said ledge being provided with parallel spaced grooves and an abutment block carried by and selectively positionable in any one of said grooves.

17. A grinder for performing a grinding operation on a blade comprising a base, a blade clamping assembly mounted on one edge of said base, said blade clamping assembly including jaw means for holding said blade transversely of said base and a helical screw for raising and lowering said jaw means to predetermined positions with respect to said base along a linear path about normal to said base and for maintaining said jaw means in said predetermined position during said grinding operation, a radial arm pivotally mounted at a fixed position on said base, said fixed position being spaced from said jaw means and on about a longitudinal center line bisecting said blade, drive means carried at the end of said radial arm over said jaw means, said drive means including a drive shaft extending at an acute angle with respect to said radial arm and in about a plane parallel to the plane of said helical screw, a grinding wheel carried on the end of said drive shaft, said grinding wheel having a relatively thin edge with respect to said blade, said edge being about tangential to a plane parallel to said base, said edge extending transversely across said blade, and control means for varying the position of said edge with respect to said blade in accordance with the radial position of said radial arm.

References Cited in the file of this patent
UNITED STATES PATENTS
946,635     Franke  ---------------- Jan. 18, 1910
(Other references on following page)

UNITED STATES PATENTS

| | | |
|---|---|---|
| 999,610 | Virdin | Aug. 1, 1911 |
| 1,750,504 | Brougher | Mar. 11, 1930 |
| 1,751,137 | Ehrlinger | Mar. 18, 1930 |
| 2,052,837 | Makaroff | Sept. 1, 1936 |
| 2,375,703 | Swartzwelder | May 8, 1945 |
| 2,428,859 | Turner | Oct. 14, 1947 |
| 2,490,848 | Vossler | Dec. 13, 1949 |
| 2,627,142 | Pickel | Feb. 3, 1953 |
| 2,885,832 | Briggs | May 12, 1959 |

FOREIGN PATENTS

| | | |
|---|---|---|
| 538,765 | Great Britain | Aug. 15, 1941 |